US008256683B2

(12) United States Patent
Von Fellenberg et al.

(10) Patent No.: US 8,256,683 B2

(45) Date of Patent: Sep. 4, 2012

(54) SECURITY DOCUMENT AND VERIFICATION METHOD

(75) Inventors: Ian Daniel Von Fellenberg, Gunzgen (DE); Beat Roland Schertenleib, Wadenswil (CH)

(73) Assignee: Orell Fussli Sicherheitsdruck AG, Zurich (CH)

(*) Notice: Subject to any disclaimer, the term of this patent is extended or adjusted under 35 U.S.C. 154(b) by 909 days.

(21) Appl. No.: 10/521,124

(22) PCT Filed: Jul. 25, 2002

(86) PCT No.: PCT/IB02/02914

§ 371 (c)(1), (2), (4) Date: Aug. 3, 2005

(87) PCT Pub. No.: WO2004/011274

PCT Pub. Date: Feb. 5, 2004

(65) Prior Publication Data

US 2006/0006236 A1 Jan. 12, 2006

(51) Int. Cl.
*G06K 21/00* (2006.01)

(52) U.S. Cl. .......... 235/489

(58) Field of Classification Search .......... 235/487, 235/489; 283/72, 91

See application file for complete search history.

(56) References Cited

U.S. PATENT DOCUMENTS

| | | | | |
|---|---|---|---|---|
| 3,539,779 | A * | 11/1970 | Clary | 235/453 |
| 4,186,943 | A | 2/1980 | Lee | |
| 4,313,984 | A | 2/1982 | Moraw et al. | |
| 4,378,480 | A | 3/1983 | Langhans | |
| 4,740,269 | A | 4/1988 | Berger et al. | |
| 4,939,888 | A | 7/1990 | Katz et al. | |
| 4,943,093 | A | 7/1990 | Melling et al. | |
| 5,087,805 | A | 2/1992 | Silverschotz et al. | |
| 5,137,304 | A | 8/1992 | Silverschotz et al. | |
| 5,298,307 | A * | 3/1994 | Suzuki et al. | 428/141 |
| 5,421,619 | A | 6/1995 | Dyball | |
| 5,447,335 | A | 9/1995 | Haslop | |
| 5,975,583 | A | 11/1999 | Cobben et al. | |
| 6,328,342 | B1 * | 12/2001 | Belousov et al. | 283/91 |
| 6,786,513 | B1 * | 9/2004 | Cobben et al. | 283/72 |
| 2002/0027359 | A1 | 3/2002 | Cobben et al. | |
| 2003/0038423 | A1 * | 2/2003 | Turner et al. | 273/157 R |

FOREIGN PATENT DOCUMENTS

| | | |
|---|---|---|
| DE | 36 28 353 | 2/1988 |
| DE | 93 15 294 | 3/1994 |
| EP | 0 443 646 | 8/1991 |
| EP | 0 523 304 | 1/1993 |
| GB | 1 319 928 | 6/1973 |

(Continued)

OTHER PUBLICATIONS

English Translation of JP 2000-233561 dated Aug. 29, 2000.

(Continued)

*Primary Examiner* — Jamara Franklin

(74) *Attorney, Agent, or Firm* — Ladas & Parry LLP

(57) ABSTRACT

A security document, such as a banknote or a check, is provided with a perforation pattern (5) having holes (5*a*, 5*b*) with elongate cross section. When viewing the perforation pattern (5) from a direction that is non-perpendicular to the surface of the document, different holes will have different optical transmission, which can be verified by eye or electronically. Perforation patterns (5) of this type are hard to forge and easy to verify.

15 Claims, 2 Drawing Sheets

FOREIGN PATENT DOCUMENTS

| | | | |
|---|---|---|---|
| GB | 1 411 477 | | 10/1975 |
| GB | 2 111 910 | | 7/1983 |
| JP | 61-200274 | | 12/1986 |
| JP | 63-260638 | | 10/1988 |
| JP | 1-157787 | | 6/1989 |
| JP | 2000-233561 | | 8/2000 |
| JP | 2002-200872 | A | 6/2002 |
| JP | 2002-200872 | | 7/2002 |
| JP | 2003312175 | | 11/2003 |
| KR | 0137807 | | 4/1998 |
| WO | 92/10371 | | 6/1992 |
| WO | 93/01057 | | 1/1993 |
| WO | 95/26274 | | 10/1995 |
| WO | 97/18092 | | 5/1997 |
| WO | 98/03348 | | 1/1998 |
| WO | 98/19869 | | 5/1998 |
| WO | 98/36916 | | 8/1998 |
| WO | 00/43216 | | 7/2000 |
| WO | 03/099580 | | 4/2003 |

OTHER PUBLICATIONS

Patent Abstracts of Japan of 1-1557787 dated Jun. 21, 1989.
Partial English Translation of JP 61-200274 dated Dec. 15, 1986.
Patent Abstracts of Japan of 63-260638 dated Oct. 27, 1988.
English Abstract of DE 36 28 353 dated Feb. 25, 1988.
English Title and summary of DE 93 15 294 dated Mar. 31, 1994.
Patent Abstracts of Japan of JP 2000-233561 dated Aug. 29, 2000 and Computer Generated English Translation of Specification and Claims.
Espacenet.com English Translation of Abstract and Claims With Drawing of JP 2002-200872 of Jul. 16, 2002.
JPO Enclish Translation of Abstract and Claims of JP 2002-200872 of Jul. 16, 2002.
ESPACENET.COM English Translation of JP 2003312175.
Abstract of JP 2003312175.
ESP@CENET.COM English Translation of JP 2002-200872.

* cited by examiner

SECURITY DOCUMENT AND VERIFICATION METHOD

TECHNICAL FIELD

The invention relates to a method for verifying the authenticity of a security document as well as to a security document having perforations of elongate cross section.

BACKGROUND ART

Fine perforations have been used successfully as a security feature for security documents, i.e. for documents the authenticity of which can be verified in a reasonably reliable manner, such as bank notes, passports or parts thereof, checks, etc.

WO 97/18092 describes a security document having a pattern of fine perforations that are visible when viewed in transmission while they are invisible when viewed in reflection. Even though this feature has found to be a very reliable means for authenticating the document, it is desired to increase the uniqueness of these and similar perforations in order to provide an even higher degree of recognizability and reliability.

WO 00/43216 teaches, inter alia, to add perforations that extend obliquely through the document and that must be viewed under a given angle. However, manufacturing such oblique perforations is difficult and their quality is likely to degrade over time, in particular when used for paper or thin plastic sheet documents that are subjected to frequent mechanical stress, such as bank notes.

DISCLOSURE OF THE INVENTION

Hence, it is an object of the present invention to provide a method and a document of the type mentioned above that further increases the reliability of this type of a security feature based on perforations.

This object is met by the method and document according to the independent claims.

The invention uses an effect that is observed with perforations having an elongate cross section. When such perforations are viewed from a direction that is non-perpendicular to the surface of the document, the transmission characteristics depend on the orientation of the viewing direction in respect to the directions of smallest and largest diameter of the cross section of the perforations. Hence, viewing the document from an direction as described above allows to determine the authenticity of the documents from the observed optical transmission of the perforations, e.g. by comparing the observed optical transmission to an expected optical transmission and rejecting the document as invalid if there is no match.

When viewing a perforation from a direction that is perpendicular to its minimum diameter, large transmission can be observed even if the angle between the viewing direction and the direction perpendicular to the document becomes large. On the other hand, when viewing a perforation from a direction that is perpendicular to its maximum diameter, the transmission is smaller. Hence, both these viewing directions are preferred viewing directions for a verification. Preferably, both viewing directions are used.

If the document comprises several perforations with different cross sections, a single view along the viewing direction allows to observe differently oriented perforations with different expected optical transmission values, which further increases the reliability of the verification.

For obtaining very strong visual effects, the minimum diameter of the elongate perforations should substantially be equal to or smaller than the thickness of the document carrier.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 1:
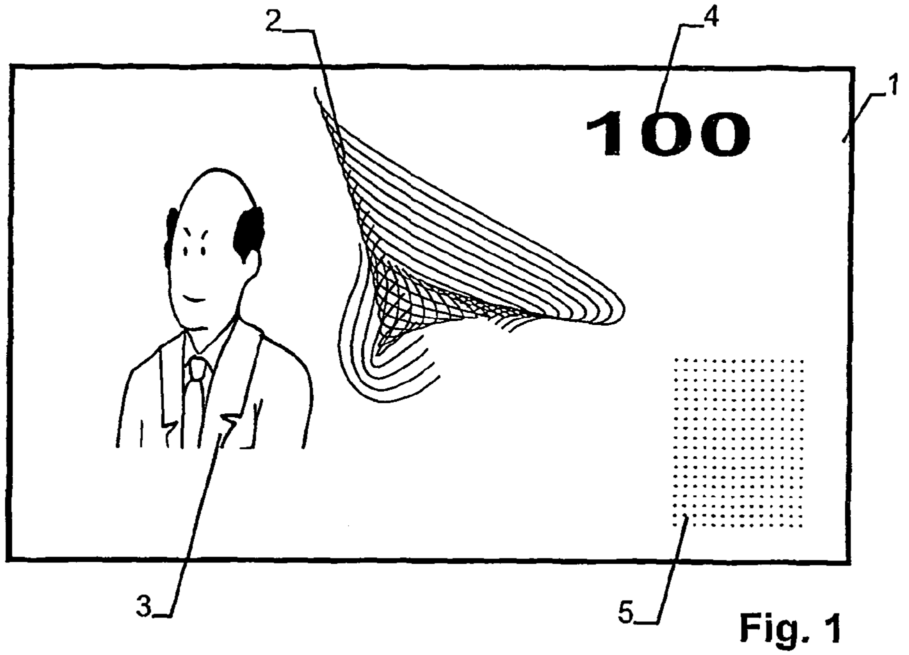
FIG. 1 shows a bank note having a security perforation pattern.

FIG. 1 shows a bank note having a carrier 1 of paper or plastic with conventional graphical and textual elements 2, 3, 4 and a security perforation pattern 5.

Figure 2:
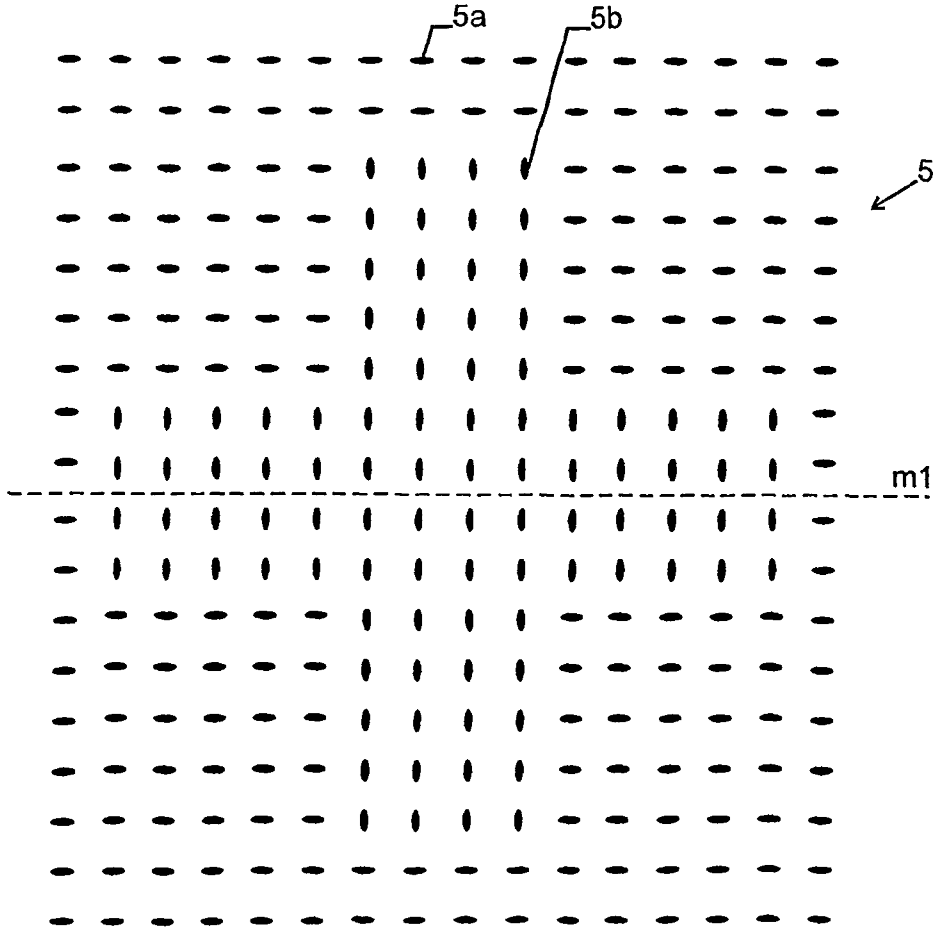
FIG. 2 shows the security perforation pattern in close view.

As shown in FIG. 2, security perforation pattern 5 comprises a plurality of perforations (holes) 5*a*, 5*b* extending through carrier 1. The perforations are arranged in a two-dimensional array. Preferably, they extend through the whole of carrier 1, but they may also extend only partially therethrough as long as the optical transmission when viewed from a viewing direction perpendicular to the surface of carrier 1 is much larger at a perforation than at unperforated locations.

As can be seen from FIG. 2, which is a close-up of perforation pattern 5, two different types of holes are used.

Figure 3:
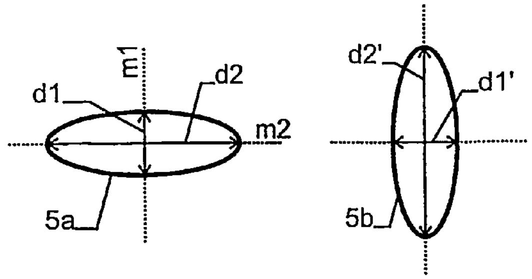
FIG. 3 shows a detail of the perforation pattern of FIG. 2.

A hole 5*a* and 5*b*, respectively, of each perforation type is shown in FIG. 3. In the shown embodiment, each hole 5*a*, 5*b* has elongate cross section and extends through carrier 1 in a direction perpendicular to the surface 1*a* of the same. The cross section is preferably substantially uniform through the carrier.

Figure 4:
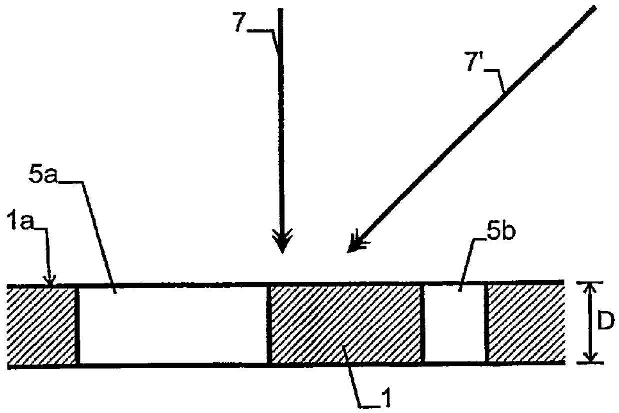
FIG. 4 is a sectional view of the perforations of FIG. 3.

The cross sections of holes 5*a* and 5*b* in the embodiment of FIGS. 3 and 4 are of equal elongate shape, but rotated in respect to each other by an angle of 90°. Each hole is of roughly ellipsoidal cross section having a minimum diameter d1 and d1' and a maximum diameter d2 and d2', respectively. The minimum diameter d1 of hole 5*a* is substantially parallel to the maximum diameter d2' of hole 5*b* and vice versa.

The minimum diameter d1 and d1', repsectively, is preferably smaller or approximately equal to the thickness D of carrier 1 and may be in the range of 50μ to 300 μm for a bank note, preferably not more than 150 μm. The maximum diameter may be substantially larger, e.g. at least 1.5 times larger than the minimum diameter.

The areas of the cross sections of the holes 5*a*, 5*b* are preferably equal. In that case, when the document is viewed against a light source in optical transmission from a viewing direction 7 that is perpendicular to surface 1*a* of carrier 1, the transmission of both types of holes is the same and the holes appear equally bright. However, when viewing from a viewing direction 7' that is not perpendicular to surface 1*a*, the amount light transmitted through the different types of holes 5*a*, 5*b* will generally be different because part of the light will be blocked be the walls of the holes. For example, when viewing the document from direction 7' of FIG. 4, around 50% of the maximum amount of light will be transmitted through hole 5*a* while hole 5*b* will appear to be substantially blocked.

Generally, a high transmission will be observed when viewing the perforation pattern along a viewing direction that is perpendicular to the direction m1 of minimum diameter d1 while a low transmission will be observed if the viewing direction is perpendicular to the direction m2 of maximum diameter d2.

This effect can be used for verifying the authenticity of the document by viewing it from at least one viewing direction that is non-perpendicular to surface 1*a*. The observed optical transmission of the perforations can e.g. be compared to an expected optical transmission from this viewing direction.

Figure 5:
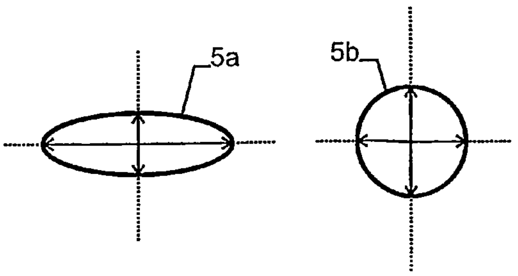
FIG. 5 is a detail of a second possible perforation pattern.
Figure 6:
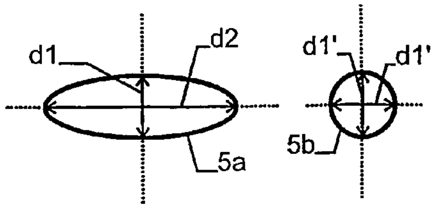
FIG. 6 is a detail of a third perforation pattern.

To simplify visual verification, it is preferred to provide carrier 1 with two types of perforations having differing cross sections, as shown in e.g. in FIGS. 3, 5 or 6. When the document is viewed from a direction non-perpendicular to surface 1*a*, the perforations of the two groups will generally have differing optical transmission, which allows to check the feature by visually comparing the transmissions.

For example, when viewing perforation pattern of FIG. 2 from a viewing direction perpendicular to direction m1 and non-perpendicular to surface 1*a*, the perforations within the cross will generally be better visible than those outside it.

In the embodiment of FIGS. 3 and 4, the two types of holes 5*a*, 5*b* have cross sections that are mutually rotated by 90°. In another embodiment, the holes have cross sections of different shape. Preferably, however, the areas of the cross sections of the different types of points are substantially equal such that the perforations have substantially uniform optical transmission when viewed along a viewing direction perpendicular to surface 1*a*. an example of two holes of such a perforation is shown in FIG. 5.

It is also possible to use a perforation pattern having more than two types of points with different cross sections for obtaining even more elaborate effects when viewing the document under an angle.

If the perforation pattern is to be inspected by a human, it is preferred to arrange the types of holes to form a human-recognizable pattern, such as the cross of FIG. 2.

The perforations of perforation pattern 5 are preferably manufactured by laser pulses. For producing a hole with elongate cross section, the beam from the laser can either be moved while applying the pulse or several separate pulses may be applied side by side in spatially overlapping manner.

The production of the perforation pattern is easiest when the dimension of all points is only varied in a single direction because this allows to use a single beam deflector to be operated during hole generation. This leads to a pattern where the minimum diameters of all holes are equal and parallel to each other.

A corresponding embodiment with elongate holes and circular holes is shown in FIG. 6. The first type of holes 5*a* has a minimum diameter d1 that is equal to both diameters d1' of the second type of holes 5*b*.

Preparing a small perforation pattern as described above by purely mechanical means is, at best, difficult. In order to avoid ridges, drilling techniques would have to be used—it is, however, highly difficult to prepare an elongate hole of the type shown here by means of a mechanical drill. Therefore, using elongate holes makes the perforation pattern more difficult to forge using mechanical production techniques.

Furthermore, mechanically manufactured perforations have rougher edges and therefore increased light scattering as compared to perforations generated by laser light.

In order to make a mechanical reproduction of the perforation pattern difficult, the minimum diameter d1, d1' of the holes should preferably be 150 μm or less.

In the embodiment shown here, the perforation pattern 5 was used in a banknote, but it may be used in other similar applications, such as in cheques or in the pages of a passport or other document that should be hard to forge. Carrier 1 is preferably paper or a flexible plastic.

While there are shown and described presently preferred embodiments of the invention, it is to be distinctly understood that the invention is not limited thereto but may be otherwise variously embodied and practiced within the scope of the following claims.

The invention claimed is:

1. A security document comprising a carrier, and a security feature with perforations in said carrier, wherein at least one of the perforations has an elongate cross section with a minimum and a maximum diameter, wherein the minimum diameter is in a range of 50 micrometer to 300 micrometer, wherein at least two of the perforations have different cross sections, wherein said perforations extend through the carrier perpendicular to a surface of the carrier, wherein said cross sections have equal areas, and wherein the security document is a document.

2. The security document of claim 1, wherein said plurality of perforations comprises a first type and a second type of perforations, wherein the minimum diameter of the first type of perforations is parallel to the maximum diameter of the second type of perforations.

3. The security document of 1, wherein said plurality of perforations have equal area of cross section and therefore uniform transmission when being viewed from a viewing direction perpendicular a surface of said carrier.

4. The security document of claim 1, wherein said perforations form a human recognizable transmission pattern when viewed under an angle that is non-perpendicular to a surface of the carrier.

5. The security document of claim 1 wherein each perforation has substantially uniform cross section through said document.

6. The security document of claim 1, wherein the carrier is of flexible plastic or paper.

7. The security document of claim 1, wherein some of said perforations have circular cross section and/or are arranged in a two-dimensional array.

8. The security document of claim 1, wherein the minimum diameter is substantially equal to or smaller than a thickness of the carrier.

9. The security document of claim 1, wherein the minimum diameters of all perforations are equal and parallel to each other.

10. The security document pattern of claim 1, wherein the maximum diameter is at least 1.5 times larger than the minimum diameter.

11. The security document of claim 1 wherein the security document is a banknote or part of a passport.

12. The security document of claim 1 wherein at least some of said perforations are arranged in a two-dimensional array.

13. A security document comprising a carrier, a first type of perforations in said carrier having elongate cross section, and a second type of perforations in said carrier having circular cross section, wherein said elongate cross section has an equal area to that of said circular cross section, wherein said first and second types of perforations extend through said document in a direction perpendicular to a surface of the carrier, wherein the security document is a document, wherein the security document is a banknote or part of a passport, and wherein said first type of perforations have a minimum and a maximum diameter, with the minimum diameter being in a range of 50 micrometer to 300 micrometer.

14. A security document comprising a carrier, and a security feature with perforations in said carrier, wherein at least one of the perforations has an elongate shape with a minimum and a maximum diameter, wherein the minimum diameter is in a range of 50 micrometer to 300 micrometer, wherein at least two of the perforations have different shapes, wherein said perforations extend through the carrier perpendicular to a surface of the carrier, wherein said shapes have equal areas, and wherein the security document is a document.

15. A security document comprising a carrier, and a security feature with perforations in said carrier, wherein at least one of the perforations has an elongate cross section with a minimum and a maximum diameter, wherein the minimum diameter is in a range of 50 micrometer to 300 micrometer, wherein at least two of the perforations have different cross sections, wherein said perforations extend through the carrier perpendicular to a surface of the carrier, wherein said cross sections have equal areas, and wherein the security document is a document.

* * * * *